United States Patent [19]

Marzocchi et al.

[11] 3,992,160

[45] Nov. 16, 1976

[54] COMBINATIONS OF PARTICULATE METAL AND PARTICULATE GLASS

[75] Inventors: Alfred Marzocchi; David E. Leary, both of Cumberland, R.I.

[73] Assignee: Owens-Corning Fiberglas Corporation, Toledo, Ohio

[22] Filed: June 27, 1974

[21] Appl. No.: 483,584

[52] U.S. Cl. .............................. 29/182.5; 75/201; 428/388
[51] Int. Cl.² .................... B22F 3/00; B22F 1/04
[58] Field of Search ............ 29/182.5; 75/201, 206, 75/208 R, 224; 428/388

[56] References Cited
UNITED STATES PATENTS

| | | | |
|---|---|---|---|
| 2,552,910 | 5/1951 | Steinman .............................. | 428/388 |
| 2,559,572 | 7/1951 | Stalego ............................... | 29/182.5 |
| 2,693,668 | 11/1954 | Slayter ............................... | 29/182.5 |
| 2,979,424 | 4/1961 | Whitehurst .......................... | 428/388 |
| 3,047,383 | 7/1962 | Slayter ............................... | 75/201 |
| 3,047,409 | 7/1962 | Slayter ............................... | 29/182.5 |
| 3,167,427 | 1/1965 | Slayter ............................... | 75/201 |
| 3,295,934 | 1/1967 | Bre .................................... | 29/182.5 |
| 3,725,091 | 4/1973 | Chyung ............................... | 75/201 |
| 3,781,170 | 12/1973 | Nakao ................................ | 29/182.5 |
| 3,844,800 | 10/1974 | Hooton .............................. | 29/182.5 |

*Primary Examiner*—Samuel W. Engle
*Assistant Examiner*—Donald P. Walsh
*Attorney, Agent, or Firm*—John W. Overman; Charles R. Schaub

[57] ABSTRACT

A composite article and method for making the same where the exterior surface of glass particles are coated with a metal. The metal coated glass particles are reduced to smaller, particular form and glass fibers are added to the reduced metal coated glass particles. The particles and glass fibers are formed under pressure to a given shape and the resulting shape is sintered to form a permanently-shaped article.

7 Claims, 4 Drawing Figures

COMBINATIONS OF PARTICULATE METAL AND PARTICULATE GLASS

Combinations of particulate metal and particulate glass are provided, the metal preferably being in powder form and the glass preferably being in fibrous or flake form. The addition of fibrous or flake glass to powdered metal as employed in powdered metallurgy to make powdered metal products, for example, has a number of advantages. It has been discovered that the addition of the glass to the powdered metal greatly increases dimensional stability so that in many instances powdered metal products made therefrom do not require additional machining or coining after being formed and sintered. At the same time, the coefficient of thermal expansion is significantly reduced, thermal conductivity increased, and frictional properties are changed. The material is more capable of deadening sound and the machineability thereof is improved by reducing chipping. The tensile strength of the resulting product also is increased in many instances. The glass fibers used in the powdered metal can have a melting point either above or below that of the metal to produce products or bodies with different characteristics. The glass particles employed can be short fibers with lengths only slightly exceeding the diameters or can be longer fibers, up to several inches in length, and can be in the form of glass flakes. The glass fibers also can be coated with a metal prior to being combined with the powdered metal, with the metal coating being the same as the powdered metal or one which will form an alloy therewith. The fibers can also be coated with materials which react with both the surface of the glass fibers and with oxides of metal powder to provide a bond therebetween. Bonding between metal and glass could also be achieved by employing a sub-oxygenated surface and applying a reducing agent to that surface to produce a form of metallic sub-oxide interface. A reducing atmosphere of $LiH_2$ and $NH_3$, for example, could also be used. Metal powder and glass fibers can also be combined with plastic materials to develop a reinforced plastic structure having a higher modulus, greater heat sink properties, higher electrical hysteresis, and more pronounced magnetic characteristics.

This invention relates to combinations of particulate metal and particulate glass and specifically to combinations of powdered metal and glass fibers.

Powdered metallurgy has made tremendous strides in the last several years. Powdered metal products also have many established advantages over metal products formed by more conventional methods and accordingly are continually receiving wider acceptance.

The present invention is based in part on the discovery that the combination of glass fibers or flakes with powdered metal can produce a number of important advantages. In particular, the dimensional stability of combinations of powdered metal and glass fibers is greatly increased with the result that many powdered metal products need not even be machined after they have been formed and sintered. The coefficient of thermal expansion of such products is significantly reduced and the thermal conductivity significantly increased. In many instances, the tensile strength of the resulting product is increased and the frictional resistance is also increased, making such materials effective for use in clutch facings, brake shoes, or rotors of disc brakes, by way of example, wherein the frictional resistance is maintained at higher temperatures than is possible with conventional metal rotors. Products made of the combination of particulate metal and glass are more effective in deadening sound and also have improved machineability because the tendency of powdered metal products to chip is reduced.

The invention can take any of three basic forms. In one, the melting point of the glass fibers is higher than that of the powdered metal, in which case the metal flows as a matrix material and in a sense acts as a binder for the glass. In another form, the metal can have a melting point above that of the glass, in which case the glass flows and acts in a sense as a matrix or binder for the metal. In the third form, the glass and metal have approximately equal melting points, resulting in an undefined metal and glass structure resulting from the two materials flowing together.

Products made from the combination of the powdered metal and glass fibers can be produced generally by the conventional method in which the powder and glass are pressed into a green shape and then sintered, the latter taking place in an inert atmosphere. Metal-coated chopped or hammer milled fibers of minute nominal length can also be employed, either alone or with additional powdered metal. When used with additional powdered metal, the metal coating on the glass fibers can be one which forms an alloy with powdered metal added later to provide a more effective bond between the glass and metal. The glass fibers can also be coated with a material which will react with the surface of the glass fibers and with oxides of the metal powder to provide an improved bond between the glass and metal. In another approach, the glass can be in the form of a mat which is combined with the powdered metal and subsequently stamped to a predetermined shape, and then sintered. The fibrous mat and powdered metal combination can also be used to make battery plates and used as sheeting in X-ray rooms. It can also be used to make pipes either by extrusion or by wrapping the mat and powdered metal combination around a mandrel. The fibers can also be coated with a particular plastic which will form a reducing atmosphere when the combined product is subsequently sintered.

Rather than combining the glass fibers and powdered metal subsequently, the powdered metal can be added to the glass filaments during forming, by surrounding the filaments while they are being attenuated with a fluidized bed of the powder. If not sintered or fused, the resulting filaments would have very rough surfaces, making them particularly suitable as a resin or cement reinforcement. A resin or even rubber reinforced with such fibers could also be more effectively cured by dielectric means. The powdered metal employed can be used with both glass fibers and a resin with the metal combining with an amine in the resin which in turn connects with the glass fibers.

It is, therefore, a principal object of the invention to provide combination of particulate metal and particulate glass in accordance with the techniques outlined above and having the advantages discussed above.

Other objects and advantages of the invention will be apparent from the following detailed description of preferred embodiments thereof, reference being made to the accompanying drawings, in which.

Figure 1:
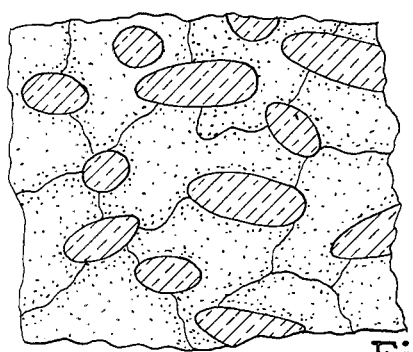
FIG. 1 is a representative microscopic view, with a magnification of about 500, of a combination of a powdered metal and glass fibers in which the glass has a higher melting point than the metal.
Figure 3:
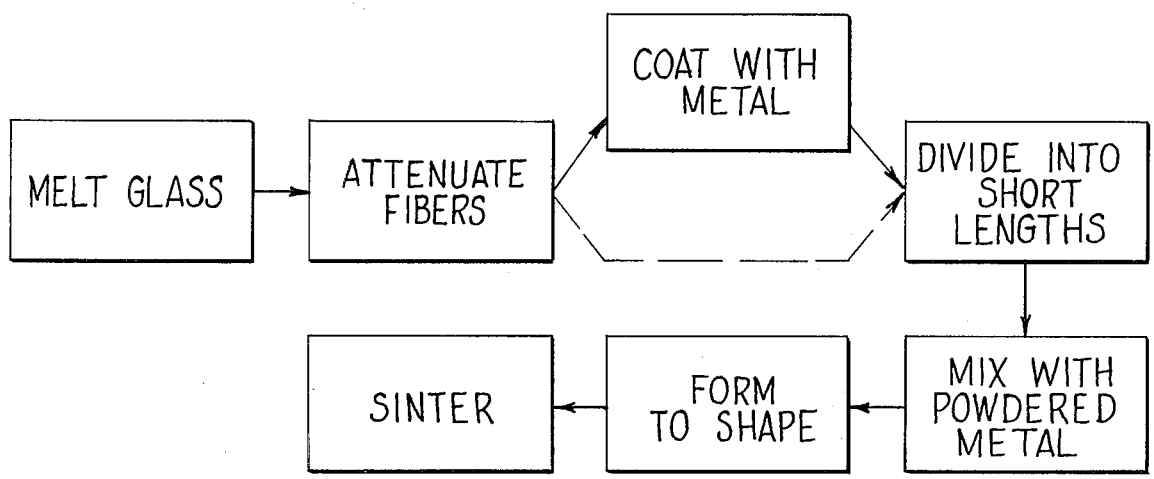
FIG. 3 is a block diagram showing the steps of the method.
Figure 4:
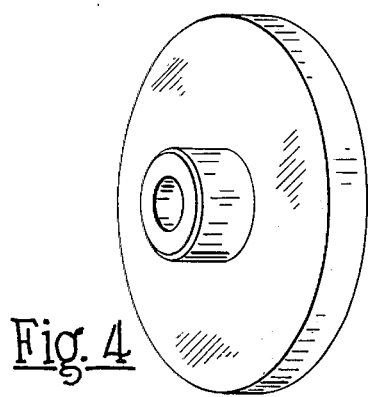
FIG. 4 is a view in perspective of a product according to the invention.

In making powdered metal-glass fiber products in which the metal has a lower melting point than the glass, metals which have been found to be suitable for this purpose include aluminum, lead, tin, and zinc, by way of illustration, resulting in a structure as shown in FIG. 1. The metal powder particles have oxides on their surfaces, resulting in lines of separation therebetween. In producing glass-aluminum bodies, aluminum-coated glass fibers can be employed. Referring to FIG. 3, such fibers are coated with aluminum when they are attenuated from bushings, with aluminum applied just below the tip section of the bushing, as is known in the art. Such coated fibers typically are 50 percent aluminum and 50 percent glass, by weight. The aluminum-coated fibers can be used in an amount from 10 percent to 50 percent by weight of the overall combination. The coated fibers are subsequently placed in a hammer mill and reduced to very short lengths, a nominal length of 1/32 inch being representative. Such particles are still fibers, however, since their lengths exceed their diameters. The coated fibers can also be placed in a ball mill and reduced to even shorter lengths. The fibers then are mixed with aluminum powder with equal weights of coated fibers and powder providing a glass content in the final product of 25 percent, by weight. The combination of the glass and metal particles is then formed to a predetermined, permanent shape (FIG. 4) and sintered at 1160° F, the melting point of the aluminum being 1261° F. By coating the fibers with the metal, a unifrom mixture of the glass and metal is assured. With separate glass and metal particles, a non-uniform mixture can result, producing a weak product.

When tin is employed as the metal, it can migrate to the surface of the glass fibers and form sub-oxides which improve the bonding between the metal and the glass-metal surface. Similar effects can be obtained with aluminum, zinc, and lead-coated glass fiber surfaces.

When the product is shaped from the glass-aluminum combination by forging, a commercially-available wax, such as Nopco Wax 22, is first added to the combination. Otherwise, the aluminum tends to seize after two or three blows. The wax will prevent such seizing if employed in an amount such as to leave only 10 grams of carbon residue per 400 grams of the powdered aluminum when melted out.

The products resulting from the combination of glass fibers and aluminum powder have an increased tensile strength over products made from the aluminum powder alone and have substantially more dimensional stability and a lower coefficient of expansion at elevated temperatures. The impact resistance of such products also appears to be improved. In general, it has been found that increased pressures employed in shaping the green product result in improved physical properties in the final product.

Figure 2:
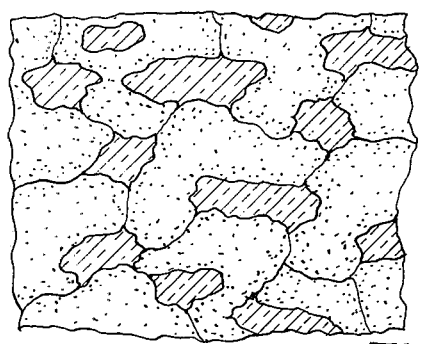
FIG. 2 is a view similar to FIG. 1 but with the metal having a higher melting point than the glass.

In those combinations of glass fibers and powdered metal in which the glass melts below the melting point of the metal, metals such as iron, beryllium and titanium can be employed and a lower melting glass can also be used if desired, such as soda-lime glass having a melting point below 2000° F. With this combination, the glass assumes a matrix form as shown in FIG. 2. With iron, for example, the combination can be sintered at about 2000° F.

Mixtures of metals can also be employed in the powdered metal-glass fiber combination. A metal coating can be employed on the glass fibers which will adhere to the fibers and also form an alloy with a different powdered metal employed. Tin and zinc can be used in such a combination, for example. Another effective powdered metal used with glass fibers is 68 percent copper, 8 percent tin, 7 percent lead, 4 percent silica, and 7 percent iron in particles ranging from +200 to −325 mesh, U.S. Standard Sieve series. When sintered with the glass fibers, the tin in this instance is found to surround the glass or wet it out and also form an alloy with the other metals. An effective bond is thereby achieved between the glass and metal.

The powdered metal can also be used with glass fiber mat, the fibers of which have lengths of 2 to 3 inches. The mat and powdered metal can be combined by use of a carding machine or by needle punching. The combination can then be compacted and sintered to provide a final product. For example, powdered lead can be used with the fibrous mat to produce an improved battery plate which should not warp and should provide a larger surface area, the plate being in the nature of a reinforced lead sponge. The lead-mat sheeting can also be used for protective sheets in X-ray rooms and should be lighter in weight than sheets now used. The combined lead and glass fiber mat could also be wound on a mandrel to produce pipe or extruded for the same purpose.

The glass fiber mat can also be used with powdered aluminum for greater ductility. The combined sheet can then be stamped to produce various products, such as automobile fenders. Where less ductility is desired, powdered iron can be used in place of the aluminum.

Powdered metal in a fluid bed can also be applied to the glass fibers immediately below the bushing, as the fibers are being attenuated. With the powder added when the fibers are still in the heat-softened state, they will tend to be embedded in the surface thereof for greater adhesion. Such fibers can be used for reinforcing purposes such as reinforcement of concrete. Further, different powdered metals can be applied to the attenuated fibers. For example, tin and zinc particles can be applied with the combination subsequently reheated to melt the tin and zinc, causing them to flow along the glass surface and produce an alloy at the interfaces.

Often materials can be added to the fibers during forming. These include materials which will react with the surface of the glass and with a thin layer of oxide on each powdered metal particle, such as sodium carbonate, borax, lithium, or certain fluorides.

Glass fibers, powdered metal, and resin can also be combined. In such an instance, with a metal such as copper, nickle, cobalt and iron employed, the powdered metal combines with an amine of the resin with this combination connecting with an amine of the glass. Such a combination is particularly effective for energy absorption, and can be used for automobile bumpers, by way of example. Rather than glass fibers, glass flake can be employed. The flakes can be metal coated on only one side by producing a bubble and vacuum coating the inside of the bubble. A controlled atmosphere can also be maintained within the bubble providing the possibility of coating with a wider variety of compounds. The flakes can be coated with hydroxy types of compounds or with silane using a silane vapor. Either the flakes or the fibers can be treated with amino or glycydoxy silanes and in line with this, it is possible to produce these reactive groups on the surfaces of the metal powders through reaction with active substances such as unsaturated alcohol, epichlorohydrin, or an unsaturated amino compound.

Various modifications of the above-described embodiments of the invention will be apparent to those skilled in the art, and it is to be understood that such modifications can be made without departing from the scope of the invention if they are within the spirit and the tenor of the accompanying claims.

We claim:

1. The method of making a composite article which consists essentially of coating the exterior surfaces of glass particles with a metal, reducing the size of the metal coated glass particles to smaller, particulate form, adding glass fibers to the reduced metal coated glass particles, forming the particles and glass fibers under pressure to a given shape, and sintering the resulting shape to form a permanently-shaped article.

2. The method according to claim 1 characterized by sintering the metal coated glass particles and glass fibers at a temperature in excess of the melting point of the glass particles.

3. The method according to claim 1 characterized by sintering the metal coated glass particles and glass fibers at a temperature in excess of the melting point of the glass fibers.

4. The method according to claim 1 characterized by sintering the metal coated glass particles and glass fibers at a temperature in excess of the melting point of the metal on the glass particles.

5. A metal-glass composite article consisting essentially of metal coated glass particles and glass fibers sintered together into an integral body.

6. The article of claim 5 wherein the metal coated glass particles are in particulate form.

7. The method of claim 5 wherein the glass fibers are from 1/32 of an inch to 3 inches in length.

* * * * *